United States Patent
Kaul (10) Patent No.: US 12,079,178 B2
(45) Date of Patent: Sep. 3, 2024

(54) SNAPSHOT VOLUME PROXY FOR OBJECT STORAGE INTERFACES

(71) Applicant: Red Hat, Inc., Raleigh, NC (US)

(72) Inventor: Yaniv Kaul, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 346 days.

(21) Appl. No.: 17/511,481

(22) Filed: Oct. 26, 2021

(65) Prior Publication Data

US 2023/0127847 A1 Apr. 27, 2023

(51) Int. Cl.
*G06F 16/00* (2019.01)
*G06F 16/11* (2019.01)
*G06F 16/182* (2019.01)
*G06F 16/188* (2019.01)

(52) U.S. Cl.
CPC .......... *G06F 16/196* (2019.01); *G06F 16/128* (2019.01); *G06F 16/1844* (2019.01)

(58) Field of Classification Search
CPC ............... G06F 16/196; G06F 16/1844; G06F 16/128
See application file for complete search history.

(56) References Cited

U.S. PATENT DOCUMENTS

| | | | |
|---|---|---|---|
| 8,006,054 B2 | 8/2011 | Ishii et al. | |
| 9,235,356 B2 | 1/2016 | Backa | |
| 10,802,862 B2 | 10/2020 | Ramanathan et al. | |
| 2005/0066037 A1* | 3/2005 | Song | G06F 16/95 709/227 |

FOREIGN PATENT DOCUMENTS

| | | |
|---|---|---|
| CN | 106027620 A | 10/2016 |
| CN | 111459415 A | 7/2020 |
| CN | 111611048 A | 9/2020 |

OTHER PUBLICATIONS

Zhang et al., "LayerMover: Storage Migration of Virtual Machine across Data Centers Based on Three-layer Image Structure," 2016, 6 pgs.
Svard et al., "Evaluation of Delta Compression Techniques for Efficient Live Migration of Large Virtual Machines," Mar. 9-11, 2011, 10 pgs.

* cited by examiner

*Primary Examiner* — Baoquoc N To
(74) *Attorney, Agent, or Firm* — Womble Bond Dickinson (US) LLP (57) ABSTRACT

A snapshot storage proxy receives a request from an object storage interface component to access a snapshot volume, wherein the request is formatted to interact with object storage data, and wherein the snapshot volume is stored as non-object storage data; translates the request from the object storage interface into a snapshot volume request, wherein the snapshot volume request is formatted to interact with non-object storage data; and accesses the snapshot volume in view of the translated snapshot volume request.

17 Claims, 7 Drawing Sheets

Receive, by a snapshot storage proxy, a request from an object storage interface component to access a snapshot volume, where the request is formatted to interact with object storage data, and where the snapshot volume is stored as non-object storage data
405

Translate, by the snapshot storage proxy, the request from the object storage interface into a snapshot volume request, wherein the snapshot volume request is formatted to interact with non-object storage data
410

Access, by the snapshot storage proxy, the snapshot volume in view of the translated snapshot volume request
415

SNAPSHOT VOLUME PROXY FOR OBJECT STORAGE INTERFACES

TECHNICAL FIELD

The present disclosure is generally related to computer systems, and more particularly, to enabling a snapshot volume proxy for object storage interfaces in cloud computing systems.

BACKGROUND

Platform-as-a-Service (PaaS) system offerings can include software and/or hardware facilities for facilitating the execution of applications (web applications, mobile applications, etc.) in a cloud computing environment (the "cloud"). Cloud computing is a computing paradigm in which a user engages a "cloud provider" to execute a program on computer hardware owned and/or controlled by the cloud provider. A cloud provider can make virtual machines (VMs) hosted on its computer hardware available to customers for this purpose. The cloud provider can provide an interface that a user can use to requisition virtual machines and associated resources such as security policies, processors, storage, and network services, etc., as well as an interface to install and execute the user's applications and files on the virtual machines.

PaaS offerings can facilitate deployment of application workloads without the cost and complexity of buying and managing the underlying hardware and software and provisioning hosting capabilities, providing the facilities to support the complete life cycle of building and delivering application workloads and services entirely available from the Internet.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for a snapshot storage proxy for facilitating communication translation between snapshot storage data and object storage interfaces in a cloud computing environment. Cloud computing environments provide many advantages over locally owned computing systems. For example, cloud computing environments can optimize resources by sharing them across multiple users and multiple clients, thereby reducing costs otherwise dedicated to procuring and maintaining local hardware. Additionally, cloud computing environments provide improved scalability for clients. Instead of purchasing additional local computing resources, supporting more data storage and buying more software licenses to support growth in the business, users can rent more storage space, acquire more bandwidth and increase access to software programs which are controlled by a cloud computing provider.

Cloud computing environments, however, can present challenges with the management of data storage. As with other types of enterprise systems, cloud computing environments can implement data protection capabilities that include storage snapshots and backups that provide point in time data copies that can be restored in the event of data corruption, data loss, or ransomware incursion. A storage snapshot is an image or reference point created at a particular point in time which preserves the state of a system, server, storage volume, etc., so that recovery can be performed to return the system to the preserved state. In conventional systems, the snapshot data is typically stored as an immutable volume (e.g., cannot be overwritten, deleted, or edited) to preserve the validity of the captured state information.

While the use of snapshots can provide significant flexibility for data recovery, various conventional cloud providers can provide storage solutions that vary from one another, which can increase complexity in the management of those snapshots. For example, some cloud computing environment clients can implement their applications using storage providers that store data as block data or file based data while others can utilize storage providers that store data as object data. File storage is network attached storage where the data is typically stored in a folder type structure. When a file needs to be accessed, the full path of file location should be known. Block storage can save data in blocks and should be accessed through a particular network structure (e.g., a storage area network (SAN)). Object storage is a type of architecture where each file is saved as an object that can be accessed using a hypertext transfer protocol (HTTP) request. Each type of storage solution involves different network configurations and storage protocols. Thus, an interface developed for one type of storage does not readily interact with data of other types.

Applications deployed in a large hybrid cloud computing environment that use different storage solution architectures can significantly increase environment complexity since data storage tools and interfaces may need to be developed for each type of storage architecture implemented. In some instances, the tools available for one type of storage solution may be significantly more robust than others, which can increase management and development costs associated for those solutions lacking robust toolsets. For example, many object storage solutions offer robust, standardized toolsets to interact with object based data, including snapshot data stored in object format. The toolsets available for many other types of data architectures may not be as robust, which can involve increases in development costs for a cloud provider to develop those tools.

Some conventional cloud providers attempt to mitigate these issues by restricting the storage architectures implemented to those with robust toolsets. This, however, can often result in a more narrowly limited storage architecture platform, which can significantly decrease the flexibility and efficiency of the cloud environment. Alternatively, cloud providers can implement solutions where snapshot data that is stored as non-object data (e.g., block data, file data, etc.) is copied to object data. While this can offer more advanced and readily available toolsets to manage the data, it can significantly increase the storage requirements as well as processing resources involved in conducting the copy operations.

Aspects of the present disclosure address the above noted and other deficiencies by implementing a snapshot storage proxy (e.g., as a computer program or a computer program component) to facilitate communication translation between snapshot storage data and object storage interfaces in a cloud computing environment. The snapshot storage proxy can expose non-object persistent snapshot image volume data as an object storage endpoint to enable an object storage interface to access the non-object data as if it were an object. Subsequently, the snapshot storage proxy can receive a request from an object storage interface (e.g., a toolset configured to access object data) to access a snapshot volume where the request formatted to interact with object storage data, and where the target data is stored as non-object storage data. The snapshot storage proxy can translate the request into a snapshot volume request that is formatted to interact with the non-object storage data, and subsequently, can access the snapshot using the translated request.

Aspects of the present disclosure present advantages over conventional solutions to the issues noted above. First, the snapshot storage proxy of the present disclosure can provide the ability to access non-object data storage solutions using the tools developed to interact with object-based storage solutions. This can significantly streamline cloud environments by providing the ability to utilize the conventionally implemented and accepted object storage tools across an environment with hybrid storage architecture without the need to replicate those tools for each storage solution. This, in turn, can significantly reduce development costs as well as processing costs associated with maintaining hybrid storage infrastructure access tools. Similarly, by translating requests formatted for object data into a format that can be recognized and processed by non-object data interfaces, the non-object data can remain in place without being copied into objects. This can significantly reduce overall storage costs since data need not be copied in order to access with more robust toolsets. Moreover, by reducing the resources needed for interacting with non-object data, the snapshot storage proxy can improve the performance of snapshot data management within the cloud environment, providing increased efficiency in management of cloud computing resources overall.

Figure 1:
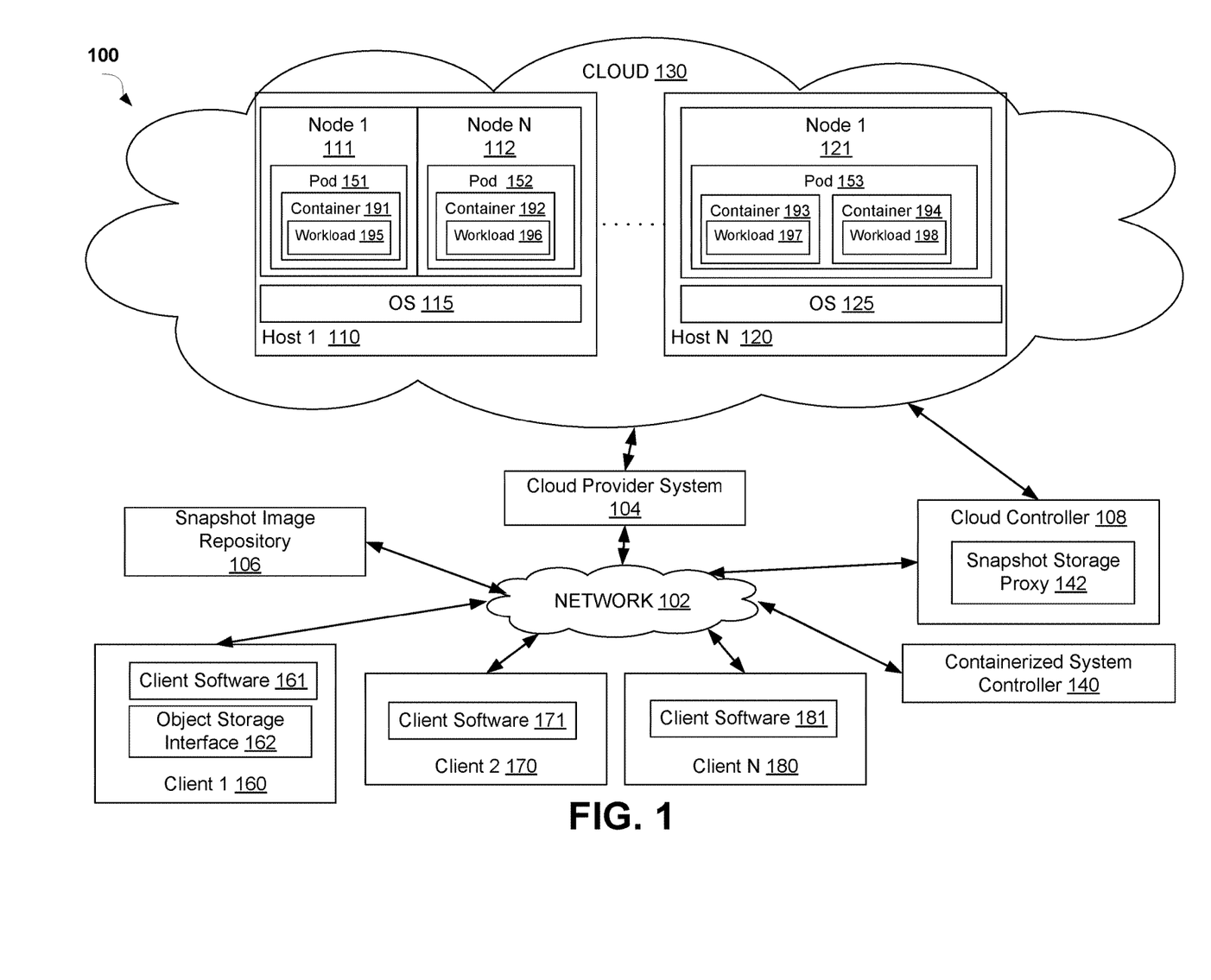
FIG. 1 depicts a high-level component diagram of an example computer system architecture, in accordance with one or more aspects of the present disclosure.

FIG. 1 is a block diagram of a network architecture 100 in which implementations of the disclosure may operate. In some implementations, the network architecture 100 may be used in a containerized computing services platform. A containerized computing services platform may include a Platform-as-a-Service (PaaS) system, such as OpenShift® or Kubernetes®. The PaaS system provides resources and services (e.g., micro-services) for the development and execution of applications owned or managed by multiple users. A PaaS system provides a platform and environment that allow users to build applications and services in a clustered compute environment (the "cloud") Although implementations of the disclosure are described in accordance with a certain type of system, this should not be considered as limiting the scope or usefulness of the features of the disclosure. For example, the features and techniques described herein can be used with other types of multi-tenant system
s and/or containerized computing services platforms.

As shown in FIG. 1, the network architecture 100 includes a cloud-computing environment 130 (also referred to herein as a cloud) that includes nodes 111, 112, 121 to execute applications and/or processes associated with the applications. A "node" providing computing functionality may provide the execution environment for an application of the PaaS system. In some implementations, the "node" may refer to a virtual machine (VM) that is hosted on a physical machine, such as host 1 110 through host N 120, implemented as part of the cloud 130. For example, nodes 111 and 112 are hosted on physical machine of host 1 110 in cloud 130 provided by cloud provider 104. In some implementations, an environment other than a VM may be used to execute functionality of the PaaS applications. When nodes 111, 112, 121 are implemented as VMs, they may be executed by operating systems (OSs) 115, 125 on each host machine 110, 120.

In some implementations, the host machines 110, 120 are often located in a data center. Users can interact with applications executing on the cloud-based nodes 111, 112, 121 using client computer systems, such as clients 160, 170 and 180, via corresponding client software 161, 171 and 181. Client software 161, 171, 181 may include an application such as a web browser. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In various implementations, developers, owners, and/or system administrators of the applications may maintain applications executing in cloud 130 by providing software development services, system administration services, or other related types of configuration services for associated nodes in cloud 130. This can be accomplished by accessing cloud 130 using an application programmer interface (API) within the applicable cloud service provider system 104. In some implementations, a developer, owner, or system administrator may access the cloud service provider system 104 from a client device (e.g., clients 160, 170, and 180) that includes dedicated software to interact with various cloud components. Additionally, or alternatively, the cloud service provider system 104 may be accessed using a web-based or cloud-based application that executes on a separate computing device that communicates with a client device via network 102.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from containerized system controller 140. In view of these commands, the cloud controller 108 provides data (e.g., such as pre-generated images) associated with different applications to the cloud provider system 104. In some implementations, the data may be provided to the cloud provider 104 and stored in a snapshot image repository 106, in an image repository (not shown) located on each host 110, 120, or in an image repository (not shown) located on each node 111, 112, 121. This data may be used for the execution of applications for a containerized computing services platform managed by the containerized system controller 140.

In various implementations, snapshot image repository 106 can store snapshot images of application data as well as delta images (e.g., information describing incremental changes made to the data stored in the most recent snapshot image). The snapshot image repository 106 can be stored as non-object data (e.g., block storage, file storage, etc.). In some implementations, data from snapshot image repository 106 can be copied to object storage. Alternatively, as discussed herein, the data from the snapshot image repository can be exposed to tools available via an object storage interface application (e.g., object storage interface 162) such that the data in snapshot image repository 106 can remain in place without being copied to object storage. Object storage interface 162 can be a component of client software 161, or a different component executed by client 160.

In one implementation, the data is used for execution of containers 191, 192, 193, 194 in one or more pods 151, 152, 153. The pods 151, 152, 153 are a group of one or more containers that are deployed together on the same node 111, 112, 121, and are the smallest compute unit that can be defined, deployed, and managed in the containerized computing service environment. Each pod 151, 152, 153 is allocated its own internal IP address, with containers 191, 192, 193, 194 within pods 151, 152, 153 being able to share local storage and networking. Pods 151, 152, 153 have a lifecycle that is defined and can run on a node 111, 112, 121 until the pod's containers exit or they are removed for some other reason.

The containers 191, 192, 193, 194 can include application images built from pre-existing application components and source code of users managing the application. An image may refer to data representing executables and files of the application used to deploy functionality for a runtime instance of the application. In some implementations, the application images can be built using various types of containerization technologies (e.g., Docker™). An image build system (not pictured) can generate an application image for an application by combining a preexisting ready-to-run application image corresponding to core functional components of the application (e.g., a web framework, database, etc.) with source code specific to the application provided by the user. The resulting application image may be pushed to image repository 106 for subsequent use in launching instances of the application images for execution in the PaaS system.

In various implementations, a container 191, 192, 193, 194 can be a secure process space on the nodes 111, 112, 121 to execute functionality of an application. In some implementations, a container 191, 192, 193, 194 is established at the nodes 111, 112, 121 and 122 with access to certain resources of the underlying node, including memory and storage. In one implementation, the containers 191, 192, 193, 194 may be established using the Linux Containers (LXC) method. In further implementations, containers 191, 192, 193, 194 may also be established using cgroups, SELinux™, and kernel namespaces, to name a few examples.

In various implementations, containers 191, 192, 193, 194 can include one or more executable workloads 195, 196, 197, 198. Workloads 195, 196, 197, 198 can be standalone applications to be executed in containers 191, 192, 193, 194 or virtual machine (VM), a virtual machine that itself hosts one or more applications, or the like. In some implementations, the executable workloads can be the containers 191, 192, 193, 194 themselves that host one or more applications or VMs, or the like.

In some implementations, cloud controller 108 may include a snapshot storage proxy 142 that facilitates communication translation with object storage interfaces for the cloud-based PaaS system described above. As noted above, the snapshot image repository 106 can store persistent snapshot volumes as non-object based data (e.g., block storage, file storage, etc.). Snapshot storage proxy 142 can expose the persistent snapshot volumes to the object storage interface 162 as if it actually were composed of object-based data. Thus, the snapshot storage proxy 142 can provide the ability to use the data access tools available via object storage interface 162 to access the non-object data in snapshot image repository 106 without copying that data to object data before doing so.

As will be discussed in further detail below, snapshot storage proxy 142 can expose configuration information from the snapshot image repository 106 to object storage interface 162 as an object storage endpoint to enable object storage interface 162 to access the non-object data. Subsequently, snapshot storage proxy 142 can receive a request from object storage interface 162 to access a snapshot volume in snapshot image repository 106. As noted above, since this request is received from the object storage interface 162, it can be formatted to interact with object storage data whereas the target data is stored as non-object storage data. Snapshot storage proxy 142 can translate the request from object storage interface 162 into a snapshot volume request, where that translated request is formatted to interact with the non-object storage data stored in snapshot image repository 106. Subsequently, snapshot storage proxy 142 can access snapshot image repository 106 using the translated request.

Similarly, snapshot storage proxy 142 can translate any response data received from the snapshot image repository 106 into a format that can be received by the object storage interface 162. In such instances, snapshot storage proxy 142 can receive a notification from snapshot image repository 106 that indicates that a request to access the applicable snapshot volume has been performed. In various implementations, the notification can include response data to be provided to the requesting client. Snapshot storage proxy 142 can translate the response received from the snapshot image repository 106 into a format that can be received by object storage interface 162, and subsequently provide the translated response to the object storage interface.

While aspects of the present disclosure describe the snapshot storage proxy 142 as implemented in a PaaS environment, it should be noted that in other implementations, the snapshot storage proxy 142 can also be implemented in an Infrastructure-as-a-Service (Iaas) environment, such as such as Red Hat OpenStack®. Additionally, while for simplicity of illustration, FIG. 1 depicts a single cloud 130, aspects of the present disclosure can be implemented to manage workloads across multiple clouds 130. In such instances the snapshot storage proxy 142 can manage storage interface translation for hybrid cloud environments, multi-cluster cloud environments, or the like. Snapshot storage proxy 142 is described in further detail below with respect to FIGS. 2-3.

Figure 2:
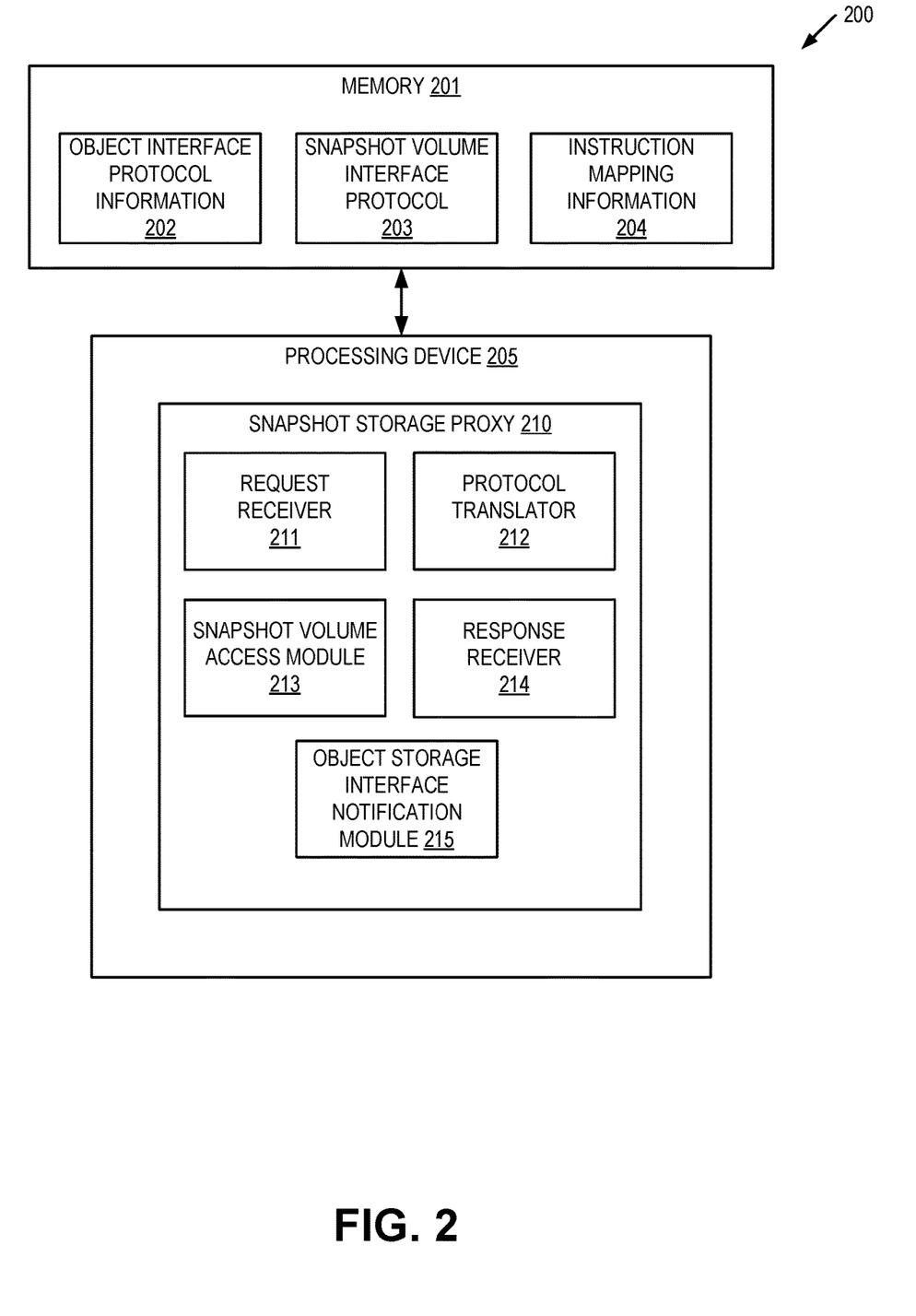
FIG. 2 depicts a block diagram illustrating an example of a snapshot storage proxy for facilitating communication translation with object storage interfaces in a cloud computing environment, in accordance with one or more aspects of the present disclosure.

FIG. 2 depicts a block diagram illustrating an example of a snapshot storage proxy 210 for facilitating communication translation with an object storage interface in a cloud computing environment. In some implementations, snapshot storage proxy 210 may correspond to snapshot storage proxy 142 of FIG. 1. As shown in FIG. 2, snapshot storage proxy 210 may be a component of a computing apparatus 200 that includes a processing device 205, operatively coupled to a memory 201, to execute snapshot storage proxy 210. In some implementations, processing device 205 and memory 201 may correspond to processing device 502 and main memory 504 respectively as described below with respect to FIG. 5.

Snapshot storage proxy 210 may include request receiver 211, protocol translator 212, snapshot volume access module 213, response receiver 214, and object storage interface notification module 215. Alternatively, the functionality of one or more of request receiver 211, protocol translator 212, snapshot volume access module 213, response receiver 214, and object storage interface notification module 215 may be combined into a single module or divided into multiple sub-modules.

Request receiver 211 is responsible for receiving a request from an object storage interface component to access a snapshot volume in a cloud computing environment. As noted above, the request can be received from a user interface (or other interface component) executing on a client device (e.g., object storage interface 161 of client 160 in FIG. 1), where that interface component includes tools/functionality that is configured to interact with object storage data. Accordingly, in various implementations, the received request can be formatted to interact with object storage data (e.g., Amazon S3® object data). Also as noted above, the snapshot volume to which access is being requested (e.g., snapshot image repository 106 in FIG. 1) can be stored as non-object storage data.

In some implementations, the request can be directed to performing various operations on the snapshot volumes using the tools that are configured for accessing object storage data. For example, the request can be a request to wherein the request comprises a request to perform a replication operation (e.g., where the target snapshot is to be replicated, etc.), a compression operation (e.g., where the target snapshot is to be compressed, etc.), an encryption operation (e.g., where the target snapshot is to be encrypted, etc.), an upload operation (e.g., where data is to be uploaded to the snapshot data store, etc.), a download operation (e.g., where the target snapshot is to be downloaded from the snapshot data store, etc.), a tiering operation (e.g., where the target snapshot is to be tiered, etc.), a versioning operation (e.g., interacting with a particular snapshot version, creating a new snapshot version, etc.), a listing operation (e.g., listing the snapshots in a volume, etc.), a creation operation (e.g., creating a new snapshot image, etc.), or a life cycling operation.

Notably, as discussed above, the requested operations can be configured by the object storage interface to interact with data configured as object data, rather than non-object data. In some implementations, the request received by request receiver 211 can be formatted using a particular application programming interface (API) protocol (or a particular communication protocol) associated with interacting with object data. As discussed below, the protocol associated with interacting with the object data can include multiple communication elements, attributes, or features that define how the object storage interface interacts with object data as well as any applicable elements, attributes, features, or content of the data stored in object data.

In some implementations, the snapshot storage proxy 210 can facilitate receipt of the request by initially exposing configuration information associated with the snapshot volume data as if it were object storage by exposing an "endpoint" for the snapshot volume data to the object storage interface. A storage endpoint can represent settings and access credentials needed to connect to the object storage API. In various implementations, the snapshot storage proxy 210 can expose the endpoint to the snapshot data such that it is in the format expected by the object storage interface, but representing the settings and access credentials needed to access the snapshot volume data that is stored as non-object data.

Protocol translator 212 is responsible for translating the request from the object storage interface into a snapshot volume request, where the snapshot volume request is formatted to interact with non-object storage data. Protocol translator 212 can perform the translation operation by examining the object-based request and determining non-object storage data operations that can be performed on the snapshot data to satisfy the request. In some implementations, protocol translator 212 can analyze the request from the object storage interface in view of an object storage interface protocol used by the interface. As noted above, the object storage interface protocol can include the elements, attributes, features, or data that define how the object storage interface interacts with object data. In some implementations, the snapshot storage proxy 210 can be specifically configured to receive requests for a specific protocol. Alternatively, the snapshot storage proxy 210 can be configured to receive requests for multiple protocols, and the request can specify the protocol used.

In various implementations, after identifying the protocol being used, protocol translator 212 can identify the applicable protocol features associated with the request from the object storage interface. In some instances, protocol translator 212 can retrieve protocol information from a data store (e.g., object interface protocol information 202) that includes the layout, format, content, etc. of the applicable object interface protocol. Alternatively, protocol translator 212 can identify this information in view of the format of the request itself. For example, in instances where the protocol being used is defined with key/value pairs, protocol translator 212 can identify the protocol features of the request by parsing the key value pairs.

In various implementations, the protocol features associated with the request can specify the particular operation to be performed on the target snapshot data, the data to be retrieved and/or modified, the location of the snapshot data, or the like. In such instances, protocol translator 212 can identify object data instructions and/or operations using the information included in the request. Alternatively, protocol translator 212 can use information from the request and access information that maps object interface protocol information to applicable object data access instructions (e.g., instruction mapping information 204).

Subsequently, protocol translator 212 can determine one or more snapshot volume instructions to perform operations on the snapshot data that are associated with the identified object storage protocol features. In other words, once protocol translator 212 identifies the object-based operations to be performed, it can then identify one or more analogous instructions that can be performed on the snapshot data to satisfy the request. In some implementations, protocol translator 212 can identify the snapshot instructions to be performed by accessing mapping information that maps an object-based instruction (or instructions) to a snapshot-based instruction (or instructions). For example, this instruction mapping can be stored in instruction mapping information 204.

Snapshot volume access module 213 is responsible for accessing the snapshot volume in view of the translated snapshot volume request. In various implementations, snapshot volume access module 213 can access the snapshot volume using the applicable instruction (or instructions) identified by protocol translator 212. In such instances, snapshot volume access module 213 can execute the one or more snapshot volume instructions to perform the snapshot operations on the snapshot volume that satisfy the received request.

Response receiver 214 is responsible for receiving a notification from the snapshot volume that the request to access the snapshot volume has been performed. The notification can include response information associated with the snapshot volume request that is formatted for a non-object storage interface. In other words, the response information may be in a format that is not readily accepted by the object storage interface component that provided the original request to request receiver 211. In various implementations, the notification can be received as a return code, a response message, an API response from the snapshot data volume, or the like.

In some implementations, response receiver 214 can invoke protocol translator 212 to translate the response received from the snapshot data volume into a format understood and/or accepted by the object storage interface component. In such instances, protocol translator 212 can translate the response information from the received notification into an object storage response, where the object storage response is formatted for the object storage interface component. In various implementations, protocol translator 212 can follow the reverse of the process mentioned above for translating the request.

For example, protocol translator 212 can analyze the response information in view of the snapshot volume interface protocol (e.g., snapshot volume interface protocol 203), where the snapshot volume interface protocol includes protocol features associated with accessing the snapshot data volume. Protocol translator 212 can then identify one or more snapshot volume features of the first set of protocol features associated with the response information from the first notification. As noted above, protocol translator 212 can identify these features by accessing the stored snapshot volume interface protocol 203, or in the alternative, identify these features using the context of the response (e.g., the key/value pair notations included in the response). Once the applicable features have been identified, protocol translator 212 can map the identified snapshot volume features to corresponding object storage interface protocol features for the object storage interface protocol associated with the original request. As noted above, protocol translator 212 can perform this mapping by accessing information stored in instruction mapping information 204. Subsequently, protocol translator 212 can generate the object storage response using this mapping.

Object storage interface notification module 215 is responsible for providing a notification to the object storage interface using the object storage response generated by response receiver 214 and protocol translator 212.

Figure 3A:
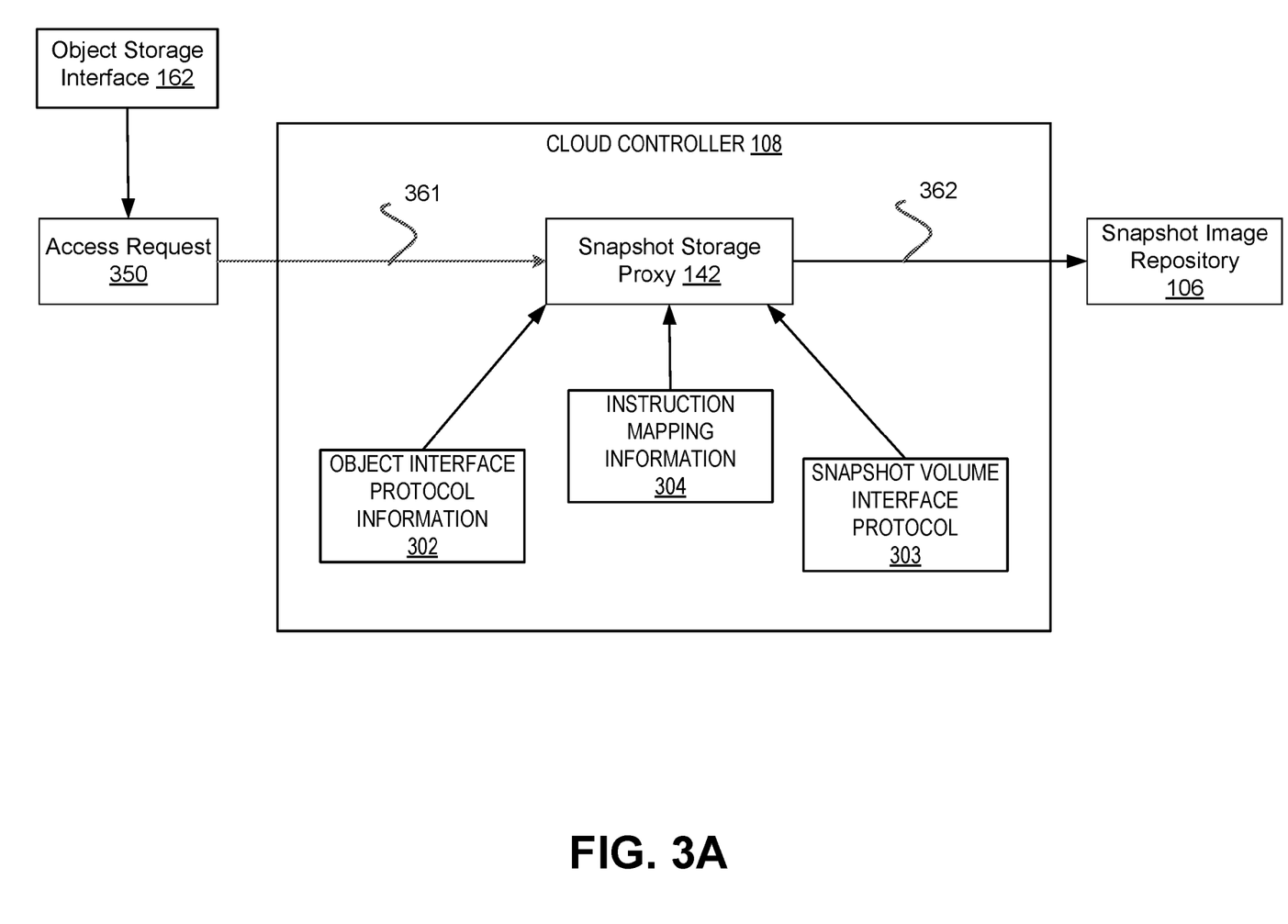
FIG. 3A illustrates an example of translating a request from an object storage interface into a snapshot data volume request in a cloud computing environment, in accordance with one or more aspects of the present disclosure.
Figure 3B:
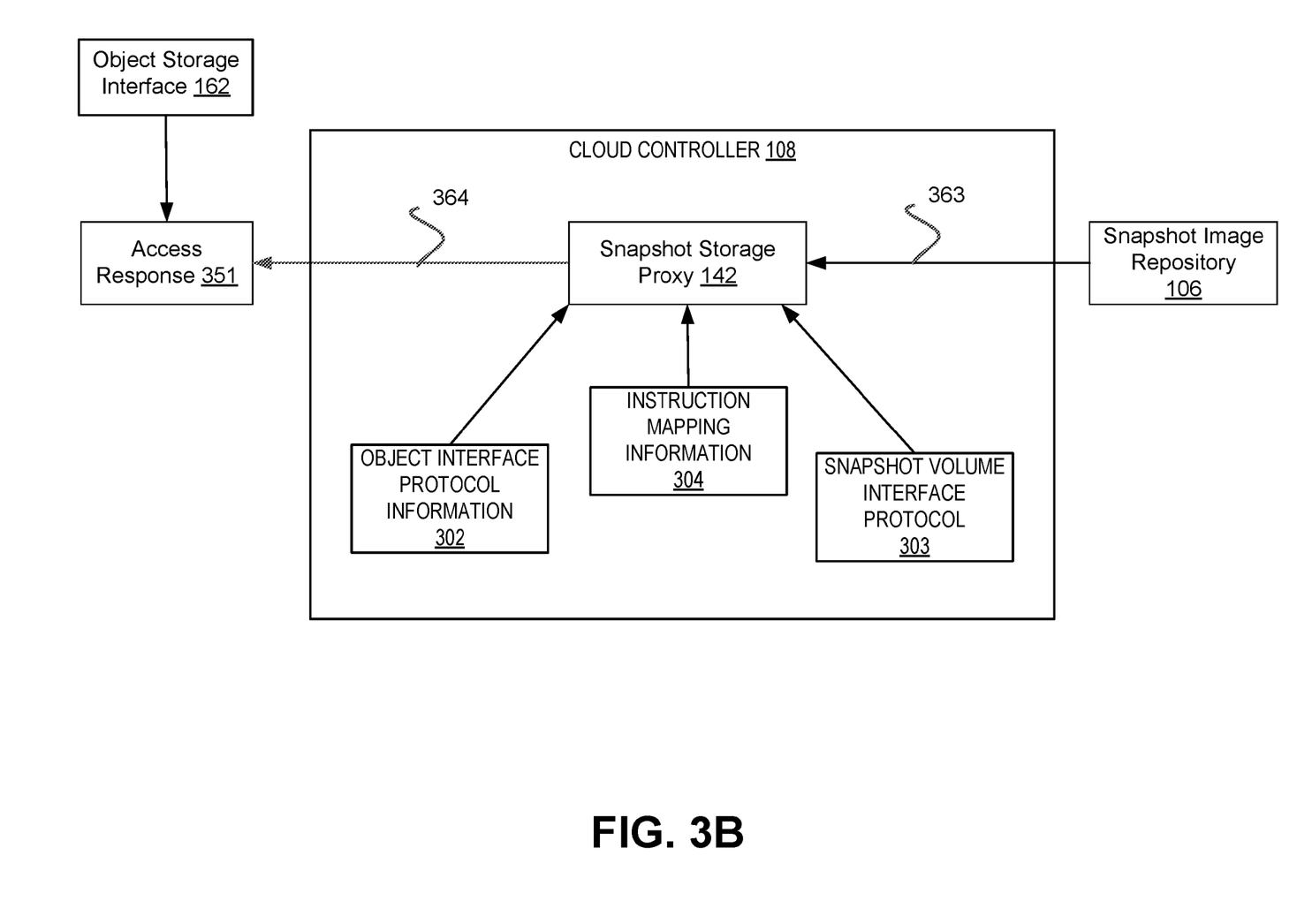
FIG. 3B illustrates an example of translating a response from a snapshot data volume to response for an object storage interface in a cloud computing environment, in accordance with one or more aspects of the present disclosure.

FIGS. 3A-3B illustrate examples of a snapshot storage proxy for facilitating communication translation with object storage interfaces in a cloud computing environment. FIG. 3A illustrates an example of translating a request from an object storage interface into a snapshot data volume request. As shown in FIG. 3A, snapshot storage proxy 142 receives a request (e.g., access request 350) from object storage interface 162 to access a persistent snapshot volume in snapshot image repository 106. As described above with respect to FIG. 2, the request can be received from a component of a client device that provides storage management interface functionality to object storage data, and the access request 350 can be formatted to interact with object storage data. Also as described above, access request 350 can be formatted to interact with object storage data, while the target snapshot data stored in snapshot image repository 106 is stored as non-object storage data.

As shown in FIG. 3A, snapshot storage proxy 142 can receive access request 350 using a communication protocol or API that specifies particular communication and/or data features associated with interacting with object storage (communication 361). Snapshot storage proxy 142 can then translate access request 350 into a format that can be processed by the snapshot image repository 106 (operation(s) 362). As described above with respect to FIG. 2, snapshot storage proxy 142 can analyze the information included the request, and identify the applicable features associated with that request. In various implementations, snapshot storage proxy 142 can conduct the analysis using stored information that describes the protocol rules associated with the object storage interface 162 (e.g., object interface protocol information 302).

Subsequently, snapshot storage proxy 142 can translate the received access request 350 by determining one or more instructions to perform operations 362 on the snapshot volume in snapshot image repository 106. In various implementations, snapshot storage proxy 142 can use the communication protocol rules associated with communication with the snapshot image repository 106 (e.g., snapshot volume interface protocol 303) as well as mapping rules that map object storage instructions to their associated snapshot volume instructions (e.g., instruction mapping information 304). Once the request has been translated to an analogous request or set of instructions that can be performed on the snapshot volume, snapshot storage proxy 142 can perform the access operation on snapshot image repository 106 to satisfy access request 350.

FIG. 3B illustrates an example of translating a response from a snapshot data volume to response for an object storage interface in a cloud computing environment As shown in FIG. 3B, snapshot storage proxy 142 receives a notification (e.g., notification 363) from snapshot image repository 106 that indicates that an access request (e.g., access request 350 of FIG. 3A) has been performed. As described above with respect to FIG. 2, the notification can include response information associated with the processed access request, where the response data is formatted for a snapshot data that is stored as persistent volumes in a non-object format (e.g., file data, block data, etc.).

As shown in FIG. 3B, snapshot storage proxy 142 can receive notification 363 using a communication protocol or API that specifies particular communication and/or data features associated with interacting with non-object data. Snapshot storage proxy 142 can then translate the notification into a format that can be processed by the object storage interface 162 (access response 351). As described above with respect to FIG. 2, snapshot storage proxy 142 can analyze the information included the response notification, and identify the applicable features associated with that response. In various implementations, snapshot storage proxy 142 can conduct the analysis using stored information that describes the protocol rules associated with the snapshot image repository 106 (e.g., snapshot volume interface protocol 303).

Subsequently, snapshot storage proxy 142 can translate the received notification by converting the features of response 363 into a response that can be received understood by the object storage interface 162. In various implementations, snapshot storage proxy 142 can use the communication protocol rules associated with communication with the object storage interface 162 (e.g., object interface protocol information 302) as well as mapping rules that map snapshot volume protocol features to corresponding object interface protocol features (e.g., instruction mapping information 304). Once the response information has been translated to an analogous response that can be received by the object storage interface 162 API, snapshot storage proxy 142 can generate the access response 351 and provide it to object storage interface 162 via communication 364.

Figure 4A:
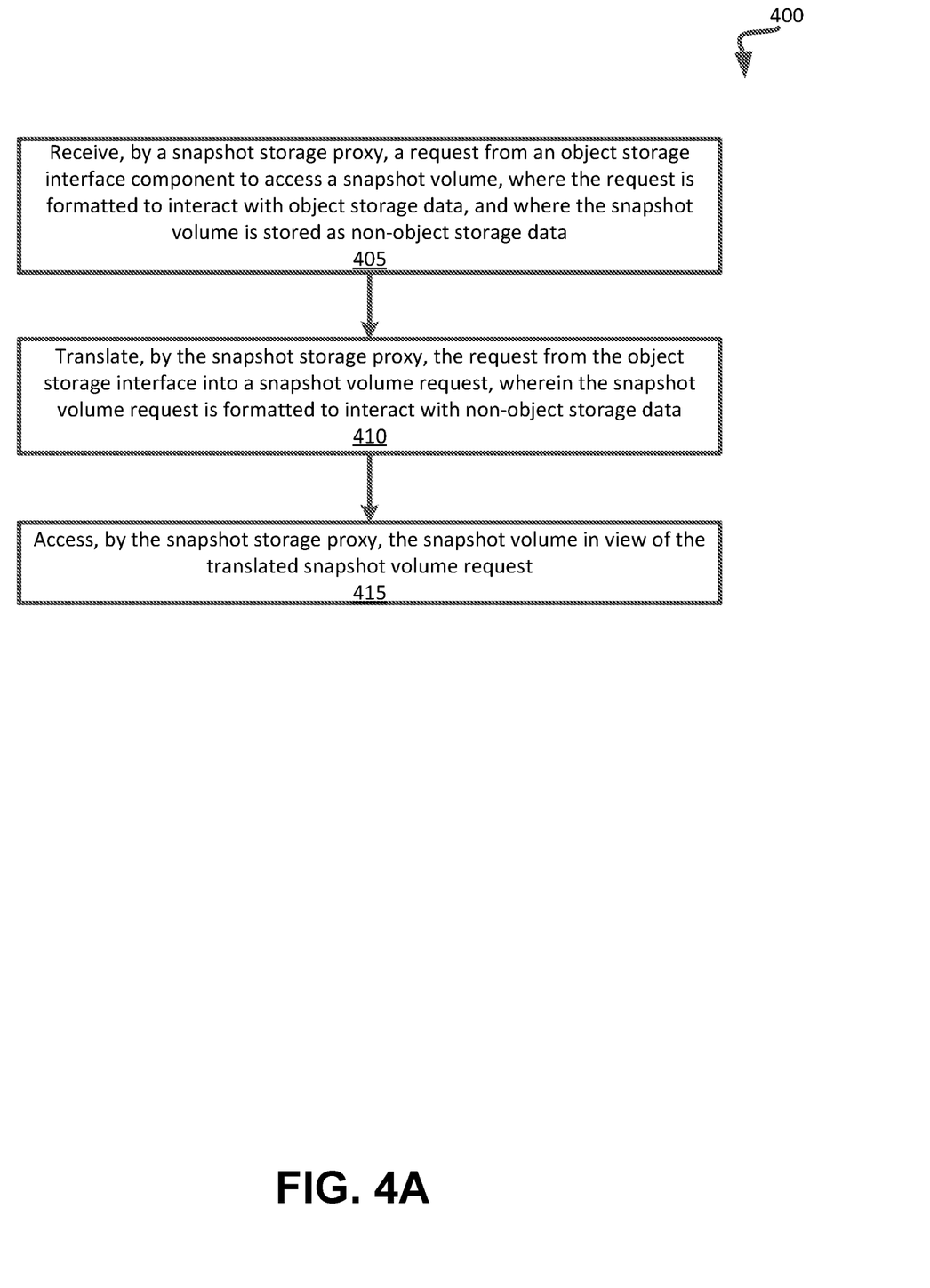
FIG. 4A depicts a flow diagram of a method for translating a request from an object storage interface into a snapshot data volume request in a cloud computing environment, in accordance with one or more aspects of the present disclosure.

FIG. 4A depicts a flow diagram of an example method 400 for translating a request from an object storage interface into a snapshot data volume request in a cloud computing environment. The method may be performed by processing logic that may comprise hardware (circuitry, dedicated logic, etc.), computer readable instructions (run on a general purpose computer system or a dedicated machine), or a combination of both. In an illustrative example, method 400 may be performed by snapshot storage proxy 142 in FIG. 1 and/or snapshot storage proxy 210 in FIG. 2. Alternatively, some or all of method 400 might be performed by another module or machine. It should be noted that blocks depicted in FIG. 4A could be performed simultaneously or in a different order than that depicted.

At block 405, processing logic receives a request from an object storage interface component to access a snapshot volume, where the request is formatted to interact with object storage data, and where the snapshot volume is stored as non-object storage data. At block 410, processing logic translates the request from the object storage interface into a snapshot volume request, where the snapshot volume request is formatted to interact with non-object storage data. At block 415, processing logic accesses the snapshot volume in view of the translated snapshot volume request.

Figure 4B:
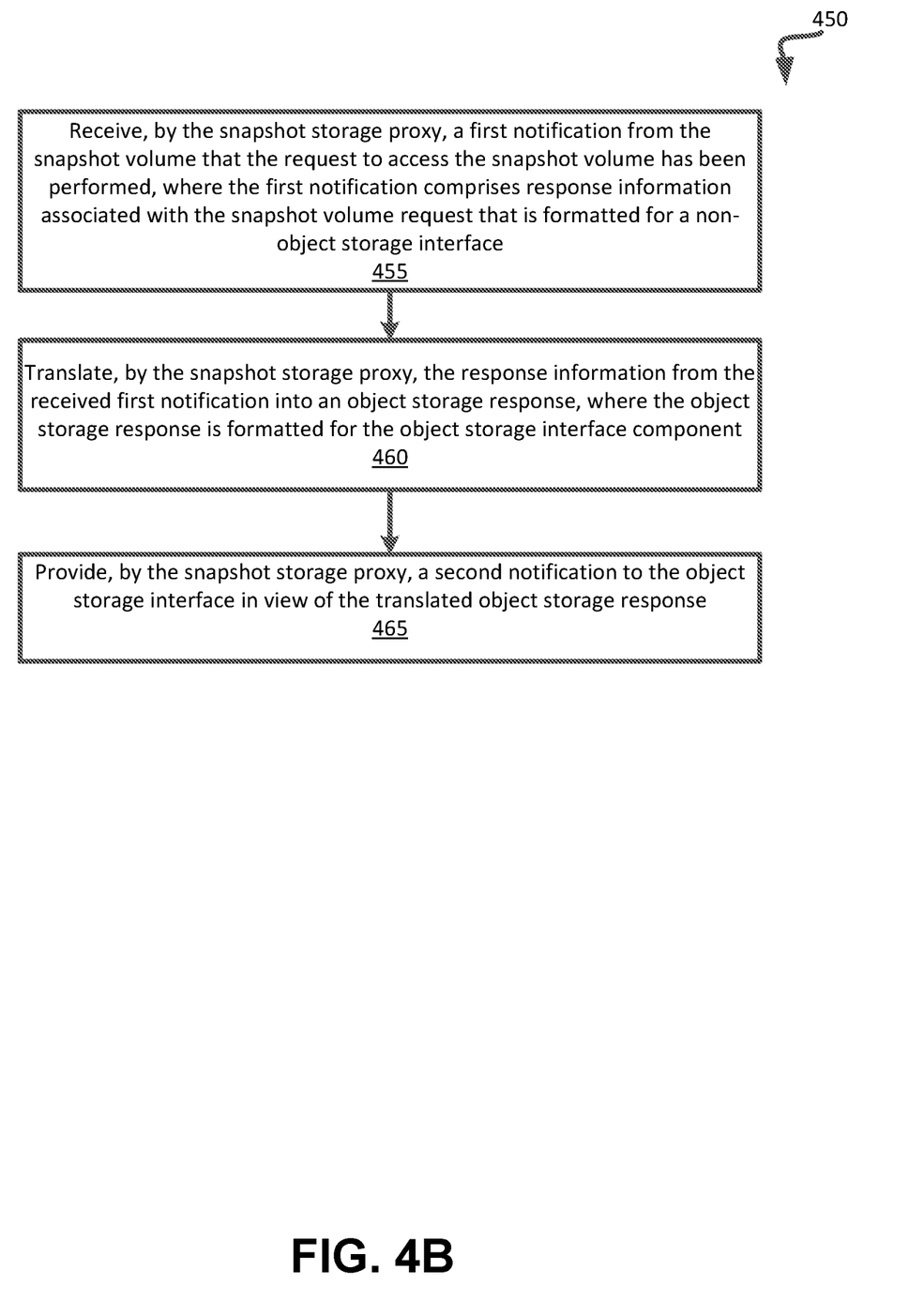
FIG. 4B depicts a flow diagram of a method for translating a response from a snapshot data volume to response for an object storage interface in a cloud computing environment, in accordance with one or more aspects of the present disclosure

FIG. 4B depicts a flow diagram of an example method 450 for translating a response from a snapshot data volume to response for an object storage interface in a cloud computing environment. The method may be performed by processing logic that may comprise hardware (circuitry, dedicated logic, etc.), computer readable instructions (run on a general purpose computer system or a dedicated machine), or a combination of both. In an illustrative example, method 450 may be performed by snapshot storage proxy 142 in FIG. 1 and/or snapshot storage proxy 210 in FIG. 2. Alternatively, some or all of method 450 might be performed by another module or machine. It should be noted that blocks depicted in FIG. 4B could be performed simultaneously or in a different order than that depicted.

At block 455, processing logic receives a first notification from the snapshot volume that the request to access the snapshot volume has been performed, where the first notification comprises response information associated with the snapshot volume request that is formatted for a non-object storage interface. At block 460, processing logic translates the response information from the received first notification into an object storage response, where the object storage response is formatted for the object storage interface component. At block 465, processing logic provides a second notification to the object storage interface in view of the translated object storage response.

Figure 5:
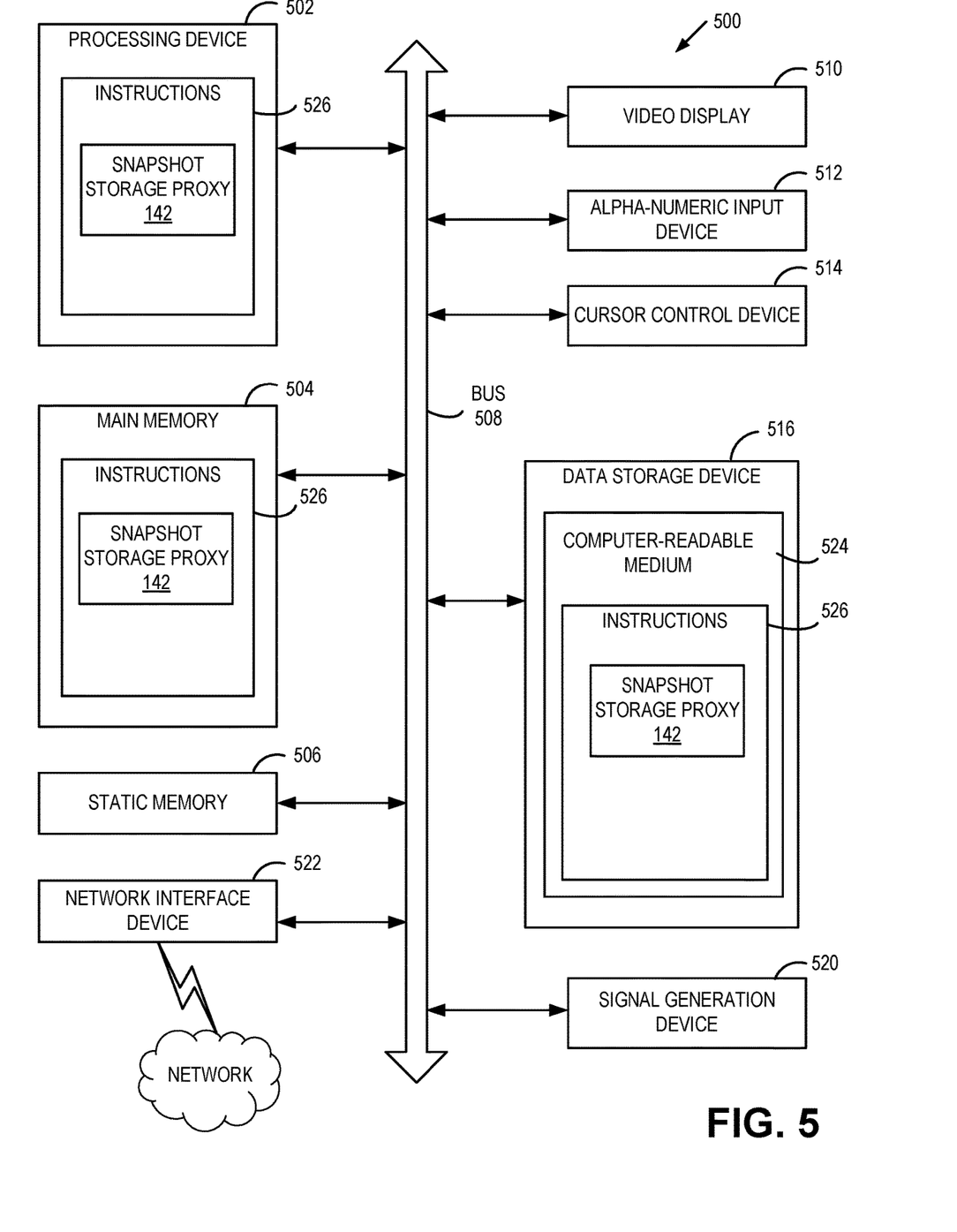
FIG. 5 depicts a block diagram of an illustrative computer system operating in accordance with one or more aspects of the present disclosure.

FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic (e.g., instructions 526) that includes snapshot storage proxy 142 for performing the operations and steps discussed herein (e.g., corresponding to the method of FIGS. 4A-4B, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable medium 524 on which may store instructions 526 that include snapshot storage proxy 142 (e.g., corresponding to the method of FIGS. 4A-4B, etc.) embodying any one or more of the methodologies or functions described herein. Snapshot storage proxy 142 may also reside, completely or at least partially, within the main memory 504 and/or within the processing device 502 during execution thereof by the computer system 500, the main memory 504 and the processing device 502 also constituting computer-readable media. Snapshot storage proxy 142 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "translating," "accessing," "identifying," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
    receiving, by a processing device executing a snapshot storage proxy, a request from an object storage interface component to access a snapshot volume, wherein the request is formatted to interact with object storage data, and wherein the snapshot volume is stored as non-object storage data;
    translating, by the snapshot storage proxy, the request from the object storage interface into a snapshot volume request by:

identifying from an object storage interface protocol, one or more object storage protocol features associated with the request from the object storage interface; and determining one or more snapshot volume instructions to perform snapshot operations associated with the identified object storage protocol features, wherein the snapshot volume request is formatted to interact with non-object storage data; and accessing, by the snapshot storage proxy, the snapshot volume in view of the translated snapshot volume request.

2. The method of claim 1, wherein accessing the snapshot volume in view of the translated snapshot volume request further comprises:

executing the one or more snapshot volume instructions to perform the snapshot operations on the snapshot volume.

3. The method of claim 1, further comprising:

receiving, by the snapshot storage proxy, a first notification from the snapshot volume that the request to access the snapshot volume has been performed, wherein the first notification comprises response information associated with the snapshot volume request that is formatted for a non-object storage interface;

translating, by the snapshot storage proxy, the response information from the received first notification into an object storage response, wherein the object storage response is formatted for the object storage interface component; and providing, by the snapshot storage proxy, a second notification to the object storage interface in view of the translated object storage response.

4. The method of claim 3, wherein translating the response information from the received first notification into an object storage response further comprises:

analyzing the response information in view of a snapshot volume interface protocol, wherein the snapshot volume interface protocol comprises a first set of protocol features;

identifying one or more snapshot volume features of the first set of protocol features associated with the response information from the first notification;

mapping the one or more snapshot volume features to corresponding object storage interface protocol features for an object storage interface protocol; and generating the object storage response in view of the mapping.

5. The method of claim 1, wherein the request comprises a request to perform at least one of a replication operation, a compression operation, an encryption operation, an upload operation, a download operation, a tiering operation, a versioning operation, a listing operation, a creation operation, or a life cycling operation.

6. The method of claim 1, further comprising:

exposing, by the snapshot storage proxy, configuration information associated with the snapshot volume as an object storage endpoint to the object storage interface component.

7. A computing apparatus comprising:

a memory; and a processing device, operatively coupled to the memory, to execute a snapshot storage proxy to:

receive a request from an object storage interface component to access a snapshot volume, wherein the request is formatted to interact with object storage data, and wherein the snapshot volume is stored as non-object storage data;

translate the request from the object storage interface into a snapshot volume request by:

identifying from an object storage interface protocol, one or more object storage protocol features associated with the request from the object storage interface; and determining one or more snapshot volume instructions to perform snapshot operations associated with the identified object storage protocol features, wherein the snapshot volume request is formatted to interact with non-object storage data; and access the snapshot volume in view of the translated snapshot volume request.

8. The computing apparatus of claim 7, wherein to access the snapshot volume in view of the translated snapshot volume request, the processing device is further to:

execute the one or more snapshot volume instructions to perform the snapshot operations on the snapshot volume.

9. The computing apparatus of claim 7, wherein the processing device is further to:

receive a first notification from the snapshot volume that the request to access the snapshot volume has been performed, wherein the first notification comprises response information associated with the snapshot volume request that is formatted for a non-object storage interface;

translate the response information from the received first notification into an object storage response, wherein the object storage response is formatted for the object storage interface component; and provide a second notification to the object storage interface in view of the translated object storage response.

10. The computing apparatus of claim 9, wherein to translate the response information from the received first notification into an object storage response, the processing device is further to:

analyze the response information in view of a snapshot volume interface protocol, wherein the snapshot volume interface protocol comprises a first set of protocol features;

identify one or more snapshot volume features of the first set of protocol features associated with the response information from the first notification;

map the one or more snapshot volume features to corresponding object storage interface protocol features for an object storage interface protocol; and generate the object storage response in view of the mapping.

11. The computing apparatus of claim 7, wherein the request comprises a request to perform at least one of a replication operation, a compression operation, an encryption operation, an upload operation, a download operation, a tiering operation, a versioning operation, a listing operation, a creation operation, or a life cycling operation.

12. The computing apparatus of claim 7, wherein the processing device is further to:

expose configuration information associated with the snapshot volume as an object storage endpoint to the object storage interface component.

13. A non-transitory computer readable storage medium, having instructions stored therein, which when executed by a processing device of a computer system, cause the processing device to:

receive a request from an object storage interface component to access a snapshot volume, wherein the request is formatted to interact with object storage data, and wherein the snapshot volume is stored as non-object storage data;

translate the request from the object storage interface into a snapshot volume request by:

identifying from an object storage interface protocol, one or more object storage protocol features associated with the request from the object storage interface; and determining one or more snapshot volume instructions to perform snapshot operations associated with the identified object storage protocol features, wherein the snapshot volume request is formatted to interact with non-object storage data; and access the snapshot volume in view of the translated snapshot volume request.

14. The non-transitory computer readable storage medium of claim 13, wherein to access the snapshot volume in view of the translated snapshot volume request, the processing device is further to:

execute the one or more snapshot volume instructions to perform the snapshot operations on the snapshot volume.

15. The non-transitory computer readable storage medium of claim 13, wherein the processing device is further to:

receive a first notification from the snapshot volume that the request to access the snapshot volume has been performed, wherein the first notification comprises response information associated with the snapshot volume request that is formatted for a non-object storage interface;

translate the response information from the received first notification into an object storage response, wherein the object storage response is formatted for the object storage interface component; and provide a second notification to the object storage interface in view of the translated object storage response.

16. The non-transitory computer readable storage medium of claim 15, wherein to translate the response information from the received first notification into an object storage response, the processing device is further to:

analyze the response information in view of a snapshot volume interface protocol, wherein the snapshot volume interface protocol comprises a first set of protocol features;

identify one or more snapshot volume features of the first set of protocol features associated with the response information from the first notification;

map the one or more snapshot volume features to corresponding object storage interface protocol features for an object storage interface protocol; and generate the object storage response in view of the mapping.

17. The non-transitory computer readable storage medium of claim 13, wherein the request comprises a request to perform at least one of a replication operation, a compression operation, an encryption operation, an upload operation, a download operation, a tiering operation, a versioning operation, a listing operation, a creation operation, or a life cycling operation.

* * * * *